United States Patent [19]

Fujiwara et al.

[11] Patent Number: 5,646,695
[45] Date of Patent: Jul. 8, 1997

[54] VIDEO SIGNAL PROCESSING METHOD AND APPARATUS FOR USE WITH PLURAL TELEVISION SYSTEMS

[75] Inventors: Yuji Fujiwara, Nishinomiya; Shouichi Nishino, Kashiwara; Sigeru Awamoto, Osaka; Toyohiko Matsuda, Katano, all of Japan

[73] Assignee: Matsushita Electric Industrial Co., Ltd., Osaka, Japan

[21] Appl. No.: 597,322

[22] Filed: Feb. 5, 1996

Related U.S. Application Data

[63] Continuation of Ser. No. 215,688, Mar. 22, 1994.

[30] Foreign Application Priority Data

Mar. 22, 1993 [JP] Japan ................................ 5-061629

[51] Int. Cl.$^6$ ........................................ H04N 5/46
[52] U.S. Cl. .................. 348/448; 348/556; 348/718; 365/230.03
[58] Field of Search ........................ 348/448, 556, 348/441, 458, 558, 714–718; 365/230.03

[56] References Cited

U.S. PATENT DOCUMENTS

| 4,597,020 | 6/1986 | Wilkinson . | |
|---|---|---|---|
| 4,729,012 | 3/1988 | Jose et al. | 348/556 |
| 4,843,471 | 6/1989 | Yazawa et al. | 348/718 X |
| 4,870,491 | 9/1989 | Ishii | 348/718 |
| 5,097,332 | 3/1992 | Faroudja . | |
| 5,163,024 | 11/1992 | Heilveil et al. | 365/230.03 |
| 5,170,276 | 12/1992 | Tabata | 348/556 |
| 5,187,575 | 2/1993 | Lim | 348/558 |
| 5,212,666 | 5/1993 | Takeda | 365/230.03 |
| 5,227,882 | 7/1993 | Kato | 348/718 X |
| 5,237,424 | 8/1993 | Nishino et al. . | |
| 5,257,106 | 10/1993 | Maruoka | 348/556 X |
| 5,339,116 | 8/1994 | Urbanus | 348/716 |
| 5,365,276 | 11/1994 | Imai et al. | 348/556 X |
| 5,373,323 | 12/1994 | Kwon | 348/718 |
| 5,376,973 | 12/1994 | Katayama et al. | 348/714 |
| 5,406,311 | 4/1995 | Michelson | 348/448 |
| 5,500,577 | 3/1996 | Kim et al. | 348/448 |

FOREIGN PATENT DOCUMENTS

| 0469861 | 2/1992 | European Pat. Off. . |
| 0471118 | 2/1992 | European Pat. Off. . |
| 0502708 | 9/1992 | European Pat. Off. . |
| 4-37293 | 2/1992 | Japan . |
| 4-217197 | 8/1992 | Japan . |
| 4-277989 | 10/1992 | Japan . |

OTHER PUBLICATIONS

European Search Report dated Jul. 25, 1994.

Primary Examiner—Victor R. Kostak
Attorney, Agent, or Firm—Ratner & Prestia

[57] ABSTRACT

In shuffling used as an efficient coding method for an input digital video signal, input digital television signals of different standards are judged in an input judging circuit, the judged information is sent out into a memory write control circuit and a memory read control circuit. The memory write control circuit determines the offset value of the vertical address according to the judgement signal, and writes the input signal at a position corresponding to the screen of the determined shuffling region of the shuffling range corresponding to each signal in the shuffling memory, or writes the block out of the shuffling range into the shuffling memory according to the specified control method in the vacant region of the shuffling range. The memory read control circuit changes over the offset value of the vertical address to be read out from the memory and the address control according to the judgement information.

12 Claims, 8 Drawing Sheets

VIDEO SIGNAL PROCESSING METHOD AND APPARATUS FOR USE WITH PLURAL TELEVISION SYSTEMS

This application is a continuation of application Ser. No. 08/215,688 filed Mar. 22, 1994.

FIELD OF THE INVENTION

The present invention relates to a video signal processing apparatus for shuffling to efficiently code a digital video signal, and its method. More particularly the invention relates to a video signal processing apparatus capable of effective shuffling with decreased hardware capacity for use with television signals having different standards, and its method.

BACKGROUND OF THE INVENTION

Shuffling is known as an efficient coding means for recording existing television signals.

In this technique, a block arrangement composed of input digital video signals is divided into plural regions, a specific number of blocks are obtained from specific positions of each region to form video segments, and while sequentially shifting the specific positions in each region, video segments are formed progressively. Accordingly, the data correlation within the video segment is weakened, and fluctuations of the data length of digital video signals within each video segment can be prevented at the time of the coding process.

When applying shuffling to high definition television (HDTV) signals, sharing of the complex hardware of the shuffling circuit by digital television signals of different standards is desirable. At present, there are three standards of HDTV as specified by the number of scanning lines and field frequency, that is, 1125 lines/60 Hz (hereinafter called 1125 system), 1050 lines/60 Hz (1050 system), and 1250/50 Hz (1250 system). Between the 1050 system and the 1250 system, the number of horizontal active pixels per line is the same, and the circuit can be shared by varying the offset value in the vertical direction. In the 1125 system, however, since the number of horizontal and vertical active pixels are both different from the other standards, and there is no matching at all, sharing of the circuit is extremely difficult.

SUMMARY OF THE INVENTION

A video signal processing apparatus comprises judging means for issuing judgement information by judging the television system of an input signal, a shuffling memory defined in the range of shuffling in the horizontal and vertical directions for accumulating image data of input signals, and control means for controlling so as to change over the writing action into the shuffling memory and reading action, depending on the judgement information from the judging means.

A video signal processing method comprises a step of judging the television system of an input signal and issuing the judgement information, a step of achieving correspondence between image region of input signal and a region of shuffling memory with a specified offset value, a step of writing at a position corresponding to the screen of the shuffling memory as for the pixel data corresponding to the screen in the shuffling memory region, and a step of writing in a vacant region of the shuffling range of the shuffling memory in a basic unit of the region of an integer multiple of blocks, as for the pixel data corresponding to the screen out of the shuffling memory region.

In this constitution, when the control means writes an input signal into a memory, the image of the input signal and the region of the shuffling memory are matched at an offset position of a specified value, and the pixel in the shuffling memory region is written into a position corresponding to the screen of the shuffling memory, while the pixel out of the shuffling memory region is written into a vacant region of the shuffling range of the shuffling memory in a basic unit of the region of an integer multiple (including a multiple of 1) of blocks.

Thus, the control means of memory writing and reading is provided with means for achieving correspondence of the region of shuffling memory depending on the input television signal, so that the memory reading control circuit of a large complex circuit and the shuffling memory can be shared effectively between multiple television systems. If television signals of different systems are entered, shuffling can be effected in a circuit of reduced complexity. Moreover, when shuffling, the vacant region is decreased, which makes it possible to suppress fluctuations of the quantity between the video segments in which data in empty region is entered and other video segments.

BRIEF DESCRIPTION OF THE DRAWINGS

FIG. 2 (b) is a conceptual diagram showing arrangements of macro blocks when data shown in FIG. 2 (a) is written into a memory.

FIG. 3 (a) is a conceptual diagram showing a first macro block arrangement subjected to conversion in accordance with FIG. 2 (a).

FIG. 3 (b) is a conceptual diagram showing a converted macro block arrangement of FIG. 3 (a).

FIG. 3 (c) is a conceptual diagram showing a second macro block arrangement subjected to conversion in FIG. 2 (a).

FIG. 3 (d) is a conceptual diagram showing a converted macro block arrangement of FIG. 3 (c).

FIG. 4 (b) is a conceptual diagram showing arrangements of macro blocks when data shown in FIG. 3 (a) is written into memory.

EMBODIMENTS OF THE INVENTION

Figure 1A:
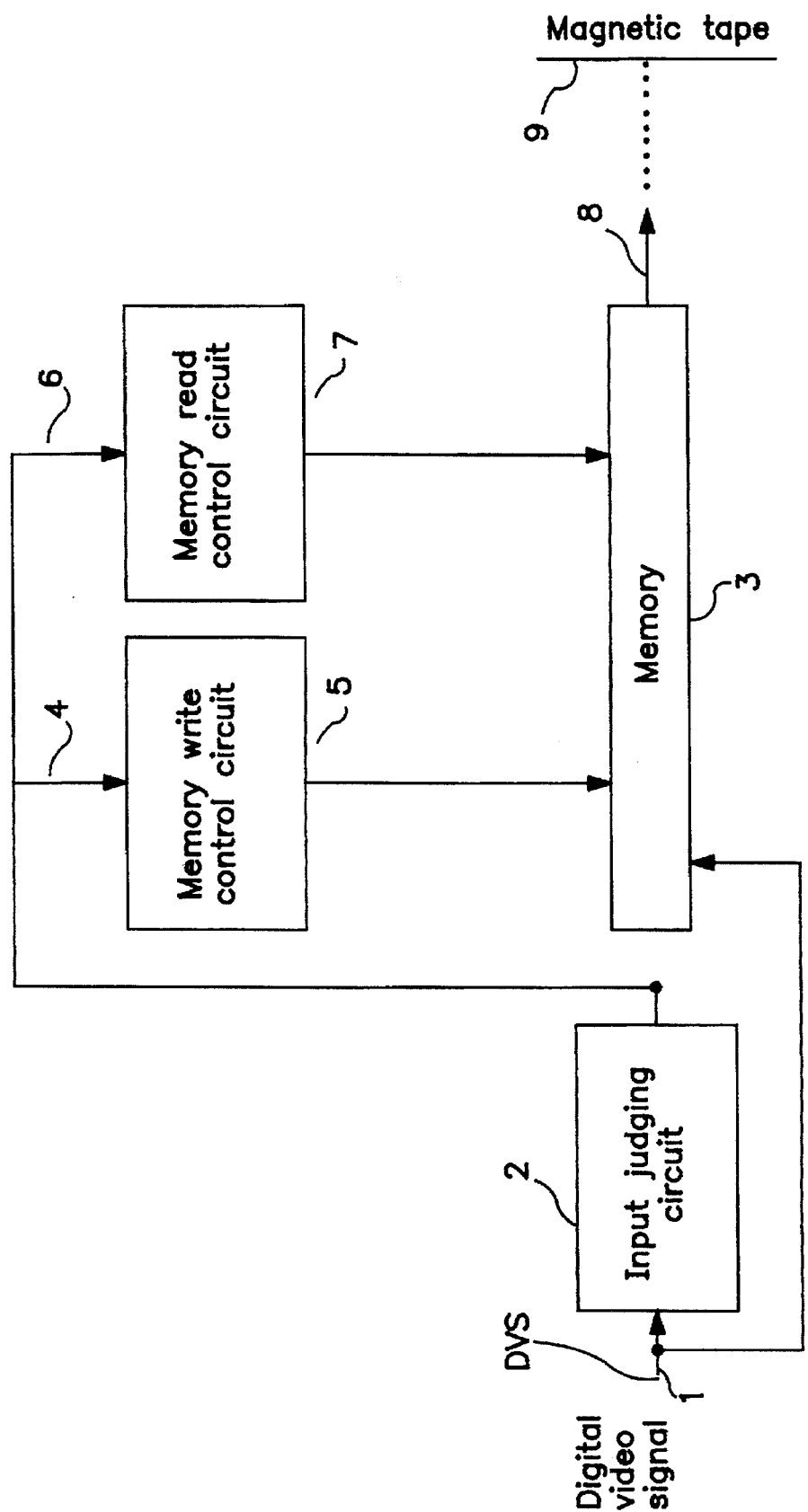
FIG. 1(a) is a block diagram of a video signal processing apparatus according to an exemplary embodiment of the present invention.
Figure 1B:
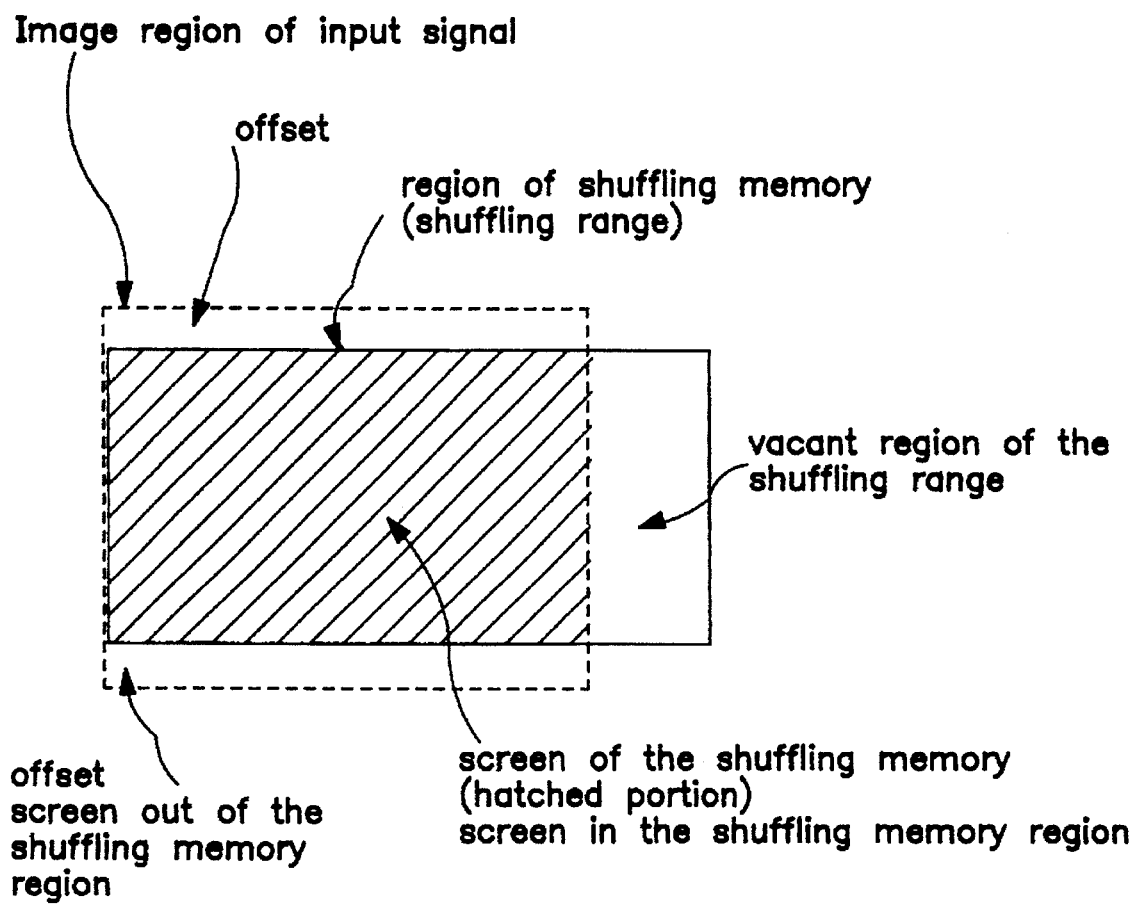
FIG. 1(b) is a conceptual diagram showing the various regions of a shuffling memory in accordance with an exemplary embodiment of the present invention.
Figure 1C:
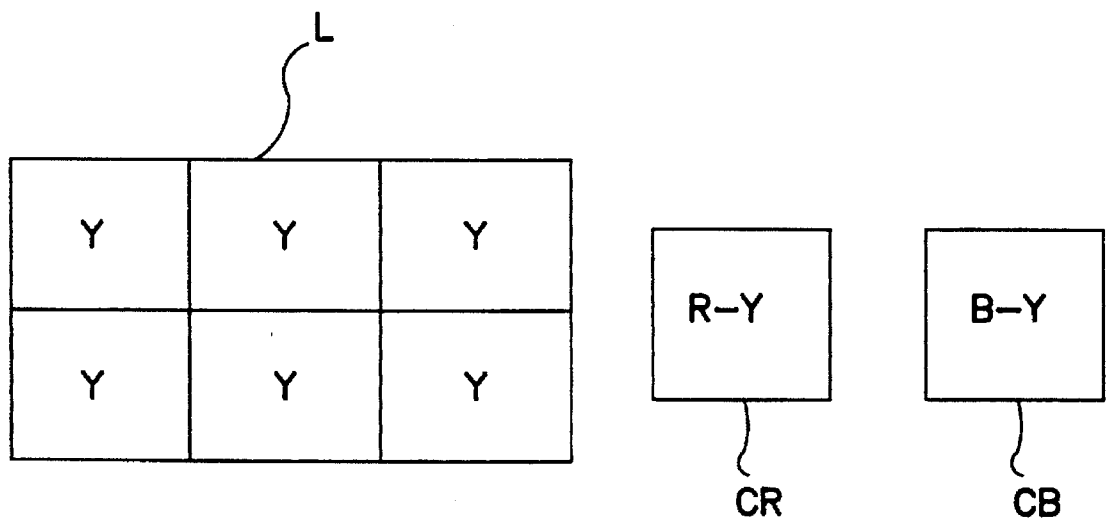
FIG. 1 (c) is a conceptual diagram of a macroblock.

In FIG. 1 (a), an example of a circuit which is shared between the 1050 system and the 1125 system is explained. First, a digital video signal DVS entered from an input terminal 1 is issued to an input judging circuit 2. In a first embodiment, it is assumed that a digital video signal sampling a luminance signal at a sampling frequency of 40.5 MHz and a color difference signal at a sampling frequency of 13.5 MHz is supplied.

In the input judging circuit 2, it is determined whether the input digital video signal is of the 1125 system or of the 1050 system. A signal indicative of the determination is sent into a memory write control circuit 5 as a signal 4, and into a memory read control signal 7 as a signal 6. The digital video signal is issued into a memory 3 for making input and output by receiving a control signal from outside. The memory write control circuit 5 and memory read control circuit 7 are collectively called control means.

The memory write control is described below. In the memory control circuit 5 in which the judgement information of the input judging circuit 2 is fed as the signal 4, when the judgement information indicates the 1050 system, the input signal is written into a position corresponding to the screen, in a shuffling memory region specified in the shuffling range corresponding to the individual signals in the memory 3. When the judgement information indicates the 1125 system, by the specified control as mentioned below, the signal is written into the same shuffling memory region as in the 1050 system. It is desirable for the digital video signal to be converted into a macro block unit which is the minimum unit of shuffling. This macro block is composed without dividing the discrete cosine transform block (DCT block) which is the minimum video segment of luminance signal and color difference signal, being constituted of a DCT block of a plurality of luminance signals corresponding to the same positions on the screen, and at least one color difference signal each.

Accordingly, one macro block in the embodiment is composed of a total of eight DCT blocks, comprising six DCT blocks of luminance signal consisting of three DCT blocks in the horizontal direction and two DCT blocks in the vertical direction, and two DCT blocks of color difference signal consisting of one R–Y signal ($C_R$) which is one of the color difference signals positioned in the same range as the six luminance signals L on the screen, and other color difference signal B–Y ($C_B$). That is, one macro block is generally composed of n DCT blocks of one kind of color difference signal, n DCT blocks of another kind of color difference signal in the same image range, and, ordinarily, multiple DCT blocks of m luminance signals in the same image range as the DCT blocks of the color difference signals. In correspondence of the macro block constitution with the input signal, the macro block constitution of one frame each consists of 42 macro blocks in the horizontal direction and 64 macro blocks in the vertical direction in the 1125 system, and 45 macro blocks in the horizontal direction and 60 blocks in the vertical direction in the 1050 system.

FIG. 1 (b) illustrates an exemplary useage of a shuffling memory in accordance with various exemplary embodiments of the present invention.

Figure 2A:
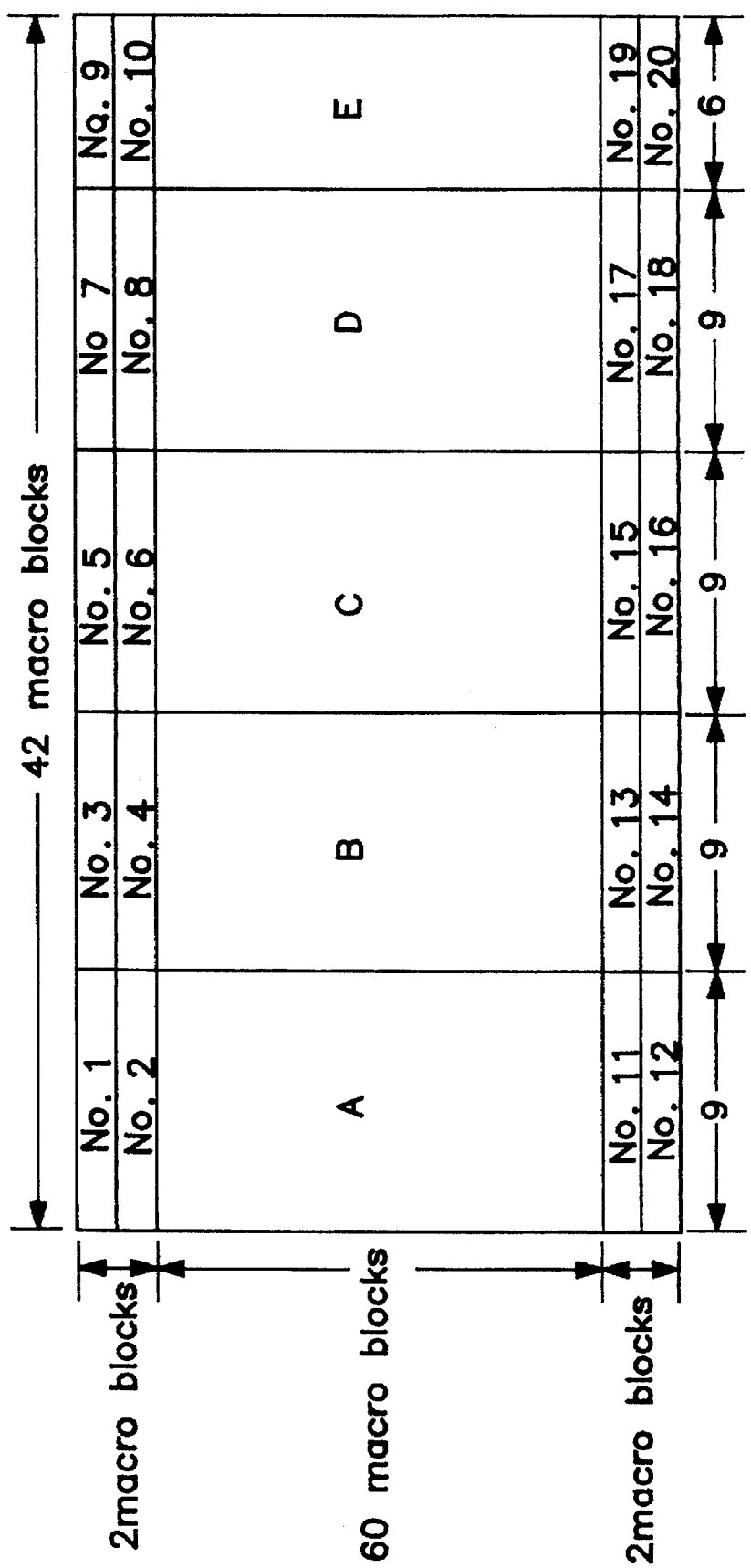
FIG. 2 (a) is a conceptual diagram showing arrangements of macro blocks of the 1125 system in accordance with a first exemplary embodiment of the present invention.
Figure 2B:
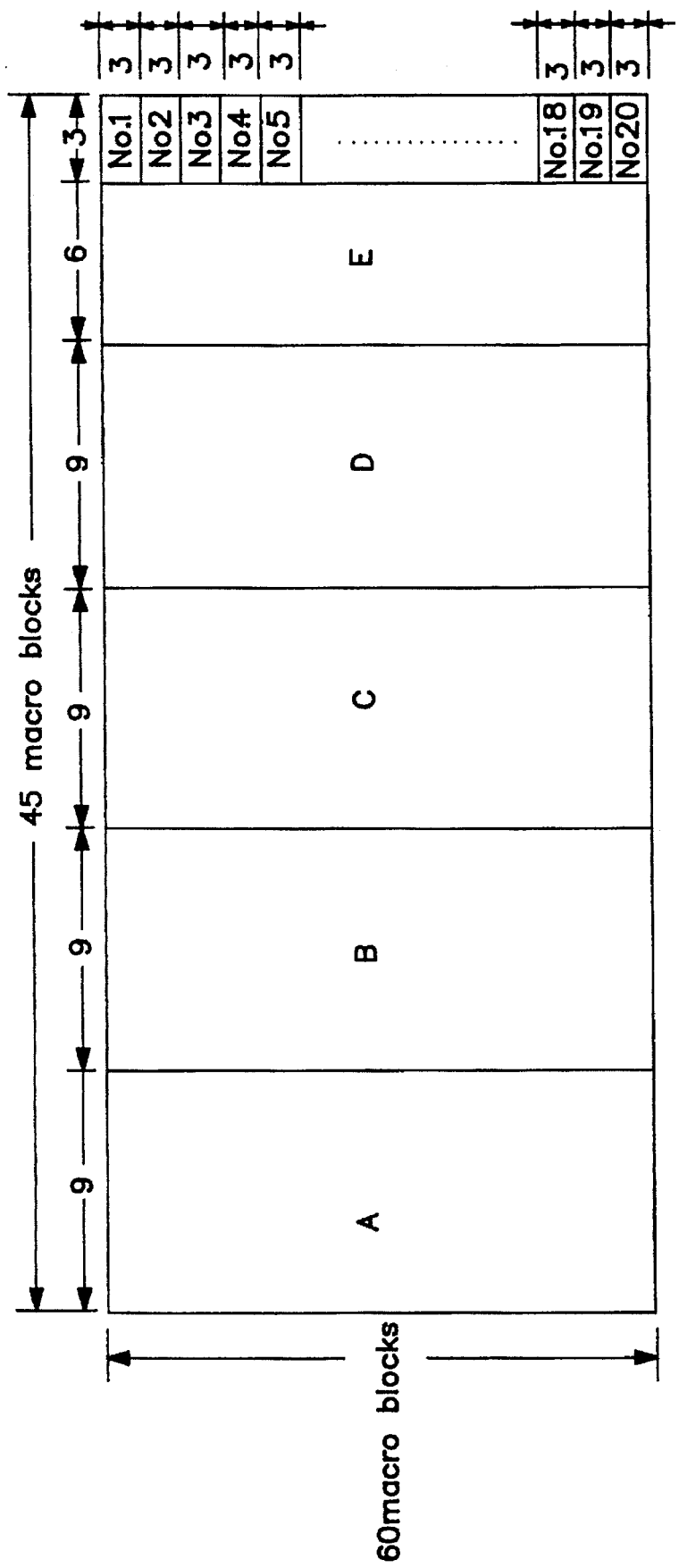
Figures 3A, 3B, 3C, 3D:
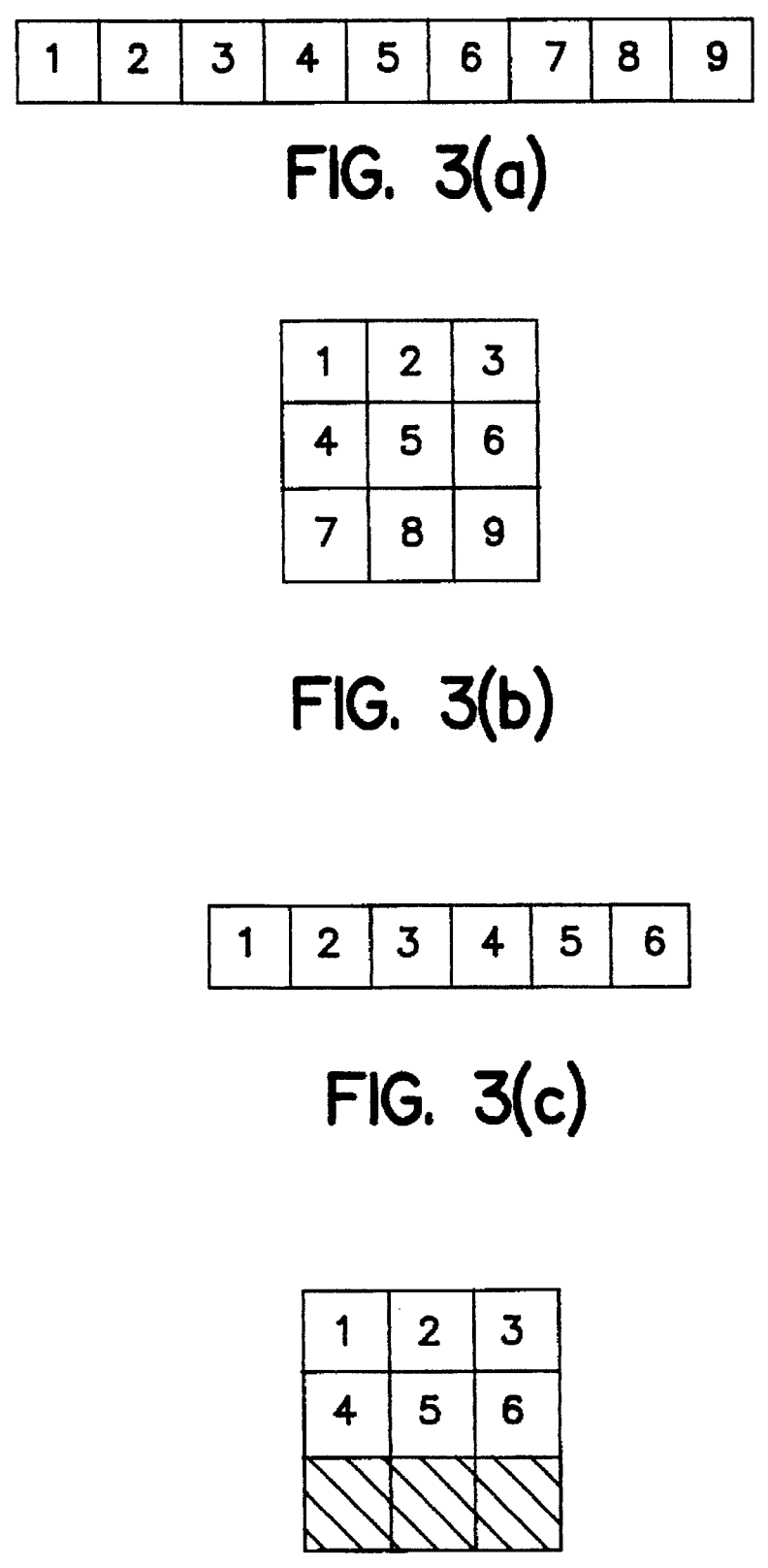

FIGS. 2 (a) and (b) show the mode of conversion of the input signal as the writing is actually controlled in the 1125 system. FIG. 2 (a) shows arrangements of macro blocks of input signals, and FIG. 2 (b) shows arrangements of macro blocks when written into the memory by controlling the input signals. Regions A, B, C, D, E in FIG. 2 (a) are offset by the portion of two macro blocks in the vertical direction, and written into 60 vertical macro blocks, 9 horizontal blocks×4+60 vertical macro blocks, 6 horizontal macro blocks. The remaining upper and lower regions 2 vertical macro blocks, 42 horizontal macro blocks each are divided into twenty regions of No. 1 to No. 20 of 1 vertical macro block, 9 horizontal macro blocks, or 1 vertical macro block, 9 horizontal macro blocks as shown in FIG. 2 (a). These twenty regions are converted into 3 vertical macro blocks, 3 horizontal macro blocks in the numerical sequence as shown in FIG. 3 (b) when there are nine horizontal macro blocks as shown in FIG. 3 (a), or into 2 vertical macro blocks, 3 horizontal macro blocks in the numerical sequence as shown in FIG. 3 (d) when there are six horizontal macro blocks as shown in FIG. 3 (c). In the meantime dummy data such as gray level is fed into the remaining three macro blocks in the shaded area. Numerals in FIG. 3 denote the sequence of macro blocks in the regions from No. 1 to No. 20.

The converted 3 vertical macro blocks, 3 horizontal macro blocks are written in the numerical sequence shown in FIG. 2 (a), at the numerical positions at the right side of regions A, B, C, D in which 60 vertical macro blocks, 9 horizontal macro blocks are written, and E in which 60 vertical macro blocks, 6 horizontal blocks are written, as shown in FIG. 2 (b).

The read control from memory is described below. In FIG. 1 (a), in the memory read control circuit 7 in which the judgement signal of the input judging circuit is fed as signal 6, one macro block at the respective position is read out from five regions composed of 60 vertical macro blocks, 9 horizontal macro blocks shown in FIG. 2 (b), and five macro blocks are read out and shuffled, and video segments are formed and issued. The digital video signals being read out from the memory 3, shuffled, and converted into video segments are issued sequentially from an output terminal 8. The signals coming out of the output terminal 8 are subjected to processing such as compression and error correction in the video segment, and finally recorded on magnetic tape 9.

In this embodiment, only two macro blocks are offset in the vertical direction, but it may also be possible to dispose, without offsetting, four macro blocks in the vertical direction not included in the 60 macro blocks in the vertical direction, at the right side of the region E, and the sequence of arrangement of macro blocks is not limited to the illustrated example, but may be specified as desired.

Explained next is a case of sharing with the 1250 system. According to an exemplary embodiment of the present invention, in the input judging circuit 2, the digital video signal entered from the input terminal 1 is determined to be in accordance with either the 1125 system, the 1050 system or the 1250 system. Information indicative of the determination is sent into the memory write control circuit 5 as signal 4 and into the memory read control signal 7 as signal 6, and the digital video signal is sent out into the memory 3 for making input and output by receiving a control signal from outside. The input macro block configuration of the 1250 system consists of 45 horizontal macro blocks and 72 vertical macro blocks, and therefore a memory region for accepting the 1250 system must be prepared.

The memory write control in this case is described below. In the memory write control 5 in which the judgement information of the input judging circuit 2 is fed as signal 4, when the judgement information indicates the 1050 system or 1250 system, the input signal is written in a range corresponding to the screen, the determined shuffling memory region of the shuffling range corresponding to each signal in the memory 3. In other words, the input signal is written in the shuffling memory region of 60 vertical blocks in the 1050 system or in 72 vertical macro blocks in the 1250 system. When the information indicative of the type of system indicates the 1125 system, by the same control as above, the signal is written into the shuffling memory region of 60 vertical macro blocks similarly as in the 1050 system. As a result, the macro block arrangement in the memory consists of 60 vertical macro blocks, 45 horizontal macro blocks in the 1050 system and 1125 system, and 72 vertical macro blocks, 45 horizontal macro blocks in the 1250 system.

In this example, the reading control from the memory is described below. In the memory read control circuit 7 in which the judgement information of the input judging circuit is fed as signal 6, the reading control is changed between the 1050 system or the 1125 system, and the 1250 system. In the former two systems, the number of macro blocks in the horizontal direction is the same, and only the number of macro blocks in the vertical direction is different. Thus, the offset value of the reading address in the vertical direction and the address control are changeable. That is, one macro block at a specified position is read out from five regions composed of 60 vertical macro blocks, 9 horizontal macro blocks shown in FIG. 2 (b) in the memory 3 in the case of 1050 system and 1125 system, or from five regions composed of 72 vertical macro blocks, 9 horizontal macro blocks in the case of 1250 system, and five macro blocks are read out and shuffled, and video segments are formed and issued. Processing after being read out from the memory 3 is the same as above. The digital video signals shuffled and converted into video segments are sequentially sent out from the output terminal 8.

Processing after the output terminal 8 is the same as above. Hence, the circuit may be easily shared with the 1250 system. If there is a memory for the 1250 systems, the signal of the 1125 system can be written into the memory 3 without changing as mentioned above. In this case, similarly as in the case of the 1250 system, it is enough to change the offset value of the reading address in the vertical direction of the memory read control circuit 7 and the address control, but the data-free region (3 horizontal macro blocks×64 vertical blocks) is also included in the video segment, and the difference of the data length of the digital video signal in the video segment increases, and the effect obtained by shuffling decreases. Besides, the effect of shuffling may be also maintained by completely changing and the reading control from the memory. At this time, however, the operation of the memory read control circuit 7 is completely free from matching with the other two systems, and the circuit complexity increases.

A second exemplary embodiment is explained by reference to FIG. 1 (a), in which the sampling frequency of input digital video signal is 54 MHz for the luminance signal, and 27 MHz for the color difference signal.

In the input judging circuit 2, it is determined whether the input digital video signal is of the 1125 system or of the 1050 system, and the information indicative of the actual system is transmitted to the memory write control circuit 5 as signal 4, and to the memory read control circuit 7 as signal 6, and the digital video signal is sent to the memory 3 for making input and output by receiving a control signal from outside.

In an exemplary embodiment of the present invention, the digital video signal is converted in the macro block unit which is the minimum unit for shuffling, similarly as in the first embodiment, the macro block is formed without dividing the DCT block which is the minimum video segment of luminance signal and the color difference signal, and consists of a plurality of DCT blocks of luminance signals and color difference signals corresponding to the same positions on the screen.

Hence, one macro block in this embodiment is composed of a total of six DCT blocks, consisting of a luminance signal of four DCT blocks (comprising two DCT blocks in the horizontal direction and two DCT blocks in the vertical direction), and two DCT blocks of a color difference signal comprising one $C_R$ and one $C_B$ at the same positions as the luminance signals on the screen. Comparing the macro block constitution with the input signals, the macro block constitution of each frame comprises 84 horizontal macro blocks and 64 vertical macro blocks in the 1125 system, and 90 horizontal macro blocks and 60 vertical macro blocks in 1050 system.

Figure 4A:
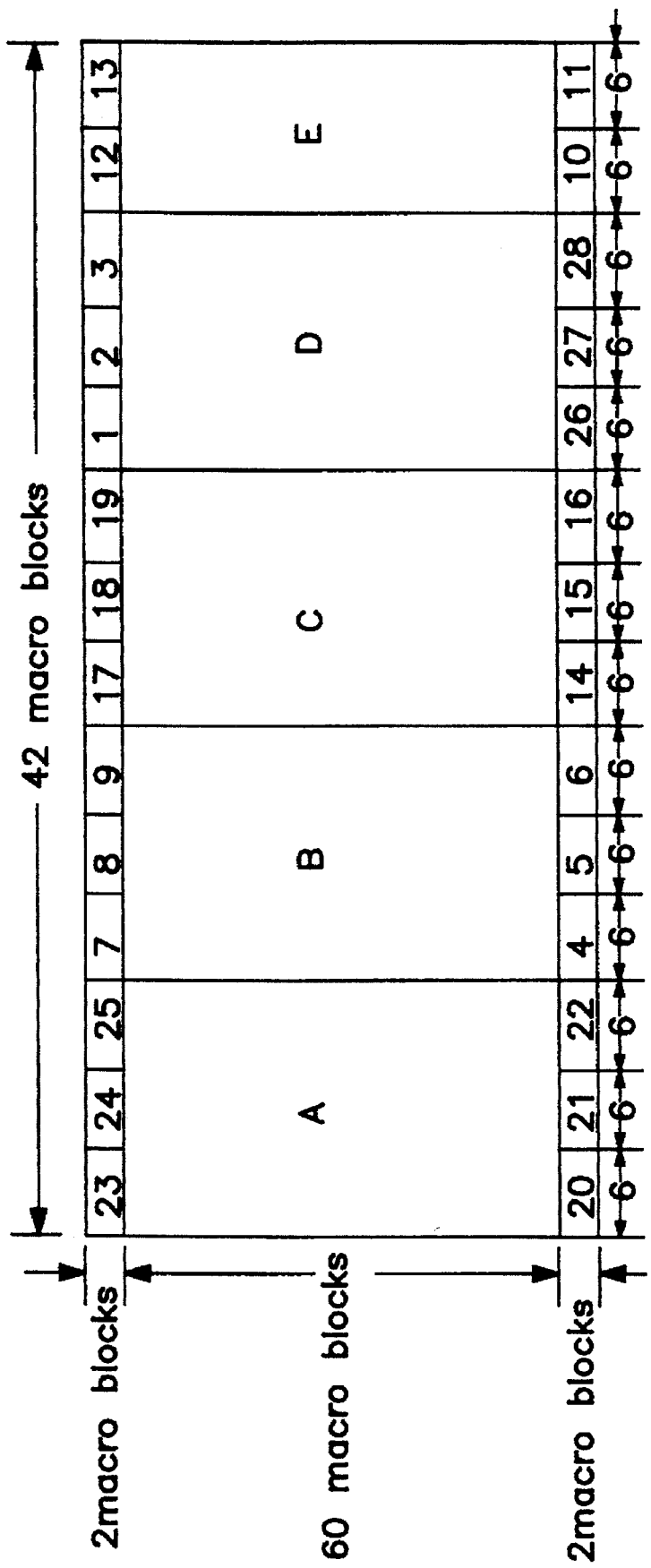
FIG. 4 (a) is a conceptual diagram showing arrangements of macro blocks of the 1125 system in accordance with a second exemplary embodiment of the invention.
Figure 4B:
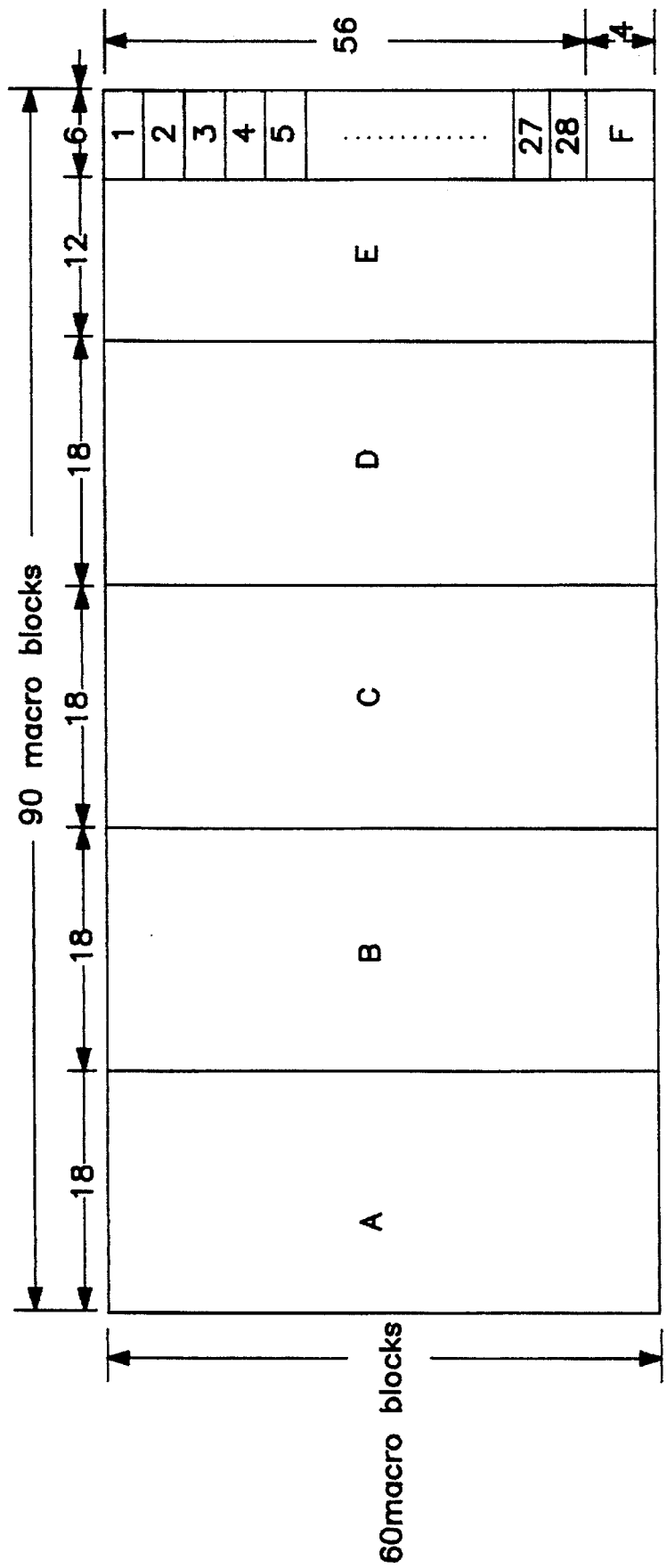

FIG. 4 shows the mode of conversion of the input signal by actual control of writing to the 1125 system, by using a shuffling memory corresponding to 1050 system. More specifically, FIG. 4 (a) shows macro block arrangements of input signals, and FIG. 4 (b) relates to macro block arrangements when written into the memory by controlling the input signals. Regions A, B, C, D and E in FIG. 4 (a) are offset in the vertical direction by the portion of two macro blocks, and written into five regions of (60 vertical macro blocks, 18 horizontal macro blocks)×4+(60 vertical macro blocks, 12 horizontal macro blocks) as shown in FIG. 4 (b). The remaining upper and lower regions of 2 vertical macro blocks and 84 horizontal macro blocks each are divided into 28 regions of two vertical macro blocks and six horizontal macro blocks as shown in FIG. 4 (a).

These 28 regions are written in the positions corresponding to the numbers at the right side of the regions A, B, C, D and E thus written, as shown in FIG. 4 (b), in the numerical sequence in the diagram without changing the constitution of the macro blocks in the region.

The reading control from the memory is explained next. In the memory read control circuit 6 in which the information from the input judging circuit 2 is fed as signal 6, one macro block at each specified position is read out from five regions composed of 60 vertical macro blocks and 18 horizontal macro blocks shown in FIG. 4 (b), and five macro blocks are read out and shuffled, and video segments are formed and issued from the memory 3. The digital video signals being read out from the memory 3, shuffled and converted in video segments are sequentially sent out from the output terminal 8.

The signal coming out of the output terminal 8 is processed by compression, color correction, etc. in Video segment unit, and is finally recorded on magnetic tape 9.

In this embodiment, as well, two macro blocks are offset in the vertical direction. However, without offsetting, it is also possible to dispose the four vertical macro blocks not contained in the 60 vertical macro blocks at the right side of block E, or the configuration of the macro blocks may be freely determined without being limited to the illustrated example.

For this embodiment, sharing with a 1250 system is explained. In the input judging circuit 2, it is determined whether the digital video signal entered from the input terminal 1 is of the 1125 system, the 1050 system or the 1250 system, and the information indicative of the determination is sent out to the memory write control circuit 5 as signal 4, to the memory read control circuit 7 as signal 6, and the digital video signal is issued to the memory 3 for making input and output by receiving a control signal from outside. The input macro block of the 1250 system consists of 90 horizontal macro blocks and 72 vertical macro blocks.

The writing control of the memory is described below. In the memory write control signal 5 in which the judgement information of the input judging circuit 2 is fed as signal 4, when the judgement information indicates the 1050 system or the 1250 system, the input signal is written into a position corresponding to the screen, in the determined shuffling memory region of the shuffling range corresponding to each signal in the memory 3. When the judgement information indicates the 1125 system, by the same control as above, the signal is written in the same shuffling memory region as in the 1050 system. As a result, the macro block arrangement in the memory consists of 60 vertical macro blocks, 90 horizontal macro blocks in the 1050 system and the 1125 system, and 72 vertical macro blocks, 90 horizontal macro blocks in the 1250 system.

Explained next is the read control from the memory. In the memory read control circuit 7 in which the information from the input judging circuit 2 is fed as signal 6, the read control is changed between the 1050 system or the 1125 system, and the 1250 system. In the former two systems, the number of macro blocks in the horizontal direction is the same, and only the number of macro blocks in the vertical direction is different, and therefore it is enough to alter the offset value of the address of reading in the vertical direction and the address control. That is, one macro block at a specific position is read out each from five regions composed of 60 vertical macro blocks, 18 horizontal macro blocks shown in FIG. 4 (b) in the memory 3 in the case of 1050 system and 1125 system, and from five regions of (72 vertical macro blocks, 18 horizontal macro blocks) in the case of 1250 system, and five macro blocks are read out and shuffled, and video segments are formed and issued. The processing after being read out from the memory 3 is same as above. The digital video signals being shuffled and converted in the video segment are sequentially issued from the output terminal 8. The processing after the output terminal 8 is same as in the case of the first embodiment. Hence, even when sharing with the 1250 system, the circuit can be easily used commonly.

Where the memory for the 1250 system is provided, the signal of the 1125 system can be written into the memory 3 without changing as mentioned above. In this case, similarly as in the case of the 1250 system, it is enough to change the offset value of the reading address in the vertical direction of the memory read control circuit 7 and the address control, but since the data-free region 6 horizontal macro blocks×64 vertical macro blocks is also included in the video segment, the shuffling effect decreases due to the same reason as in the first embodiment. In addition, by completely changing the read control from the memory, it is also possible to maintain the shuffling effect. However, in such a case, the operation of the memory read control circuit 6 may not be in conformity with the other two signals systems, resulting in an increase in circuit complexity.

Thus, the invention is capable of processing an input signal regardless of the sampling frequency of that signal. In addition, the manner of selecting the macro blocks to be converted, the writing position of the macro blocks to be converted, the data to be used a dummy data, and the manner of selecting the macro blocks for inserting the dummy data are all free and arbitrary.

What is claimed:

1. A video signal processing apparatus for receiving a digital video signal from one of plural television systems differing in the number of effective pixels, each of the digital video signals arranged in a respective block, and the video signal processing apparatus for changing the arrangement of pixel data in the digital video signal, comprising:

judging means for producing judgement information determining a television system of an input digital signal, said input digital signal having image data and an input image region, a shuffling memory having a shuffling range in the horizontal and vertical directions for accumulating the image data of the input digital signal, said shuffling range including a screen region, and control means for controlling the writing action into and reading action from the shuffling memory, depending on the judgement information from the judging means, wherein the control means achieves correspondence between the input image region of the input digital signal and the shuffling range of the shuffling memory with a specific offset value, when writing into the shuffling memory of the input signal, where at least one of the subblocks units of the input digital signal is written into a position corresponding to the screen of the shuffling memory, and the subblock units out of the screen region of the shuffling memory are written into a vacant region of the shuffling range of the shuffling memory in an integer multiple of the subblock units.

2. A video signal processing apparatus of claim 1, wherein the control means comprises a memory write control circuit for controlling the writing into the shuffling memory region, and a read control circuit from the shuffling memory region.

3. A video signal processing apparatus of claim 1, wherein the control means includes means for controlling writing of the plurality of pixel data values into a plurality of positions each corresponding to the screen of the shuffling memory, and for controlling reading of the plurality of pixel data values out of the shuffling memory region and writing into a vacant region of the shuffling range, of the shuffling memory in the basic unit of the region of an integer multiple of the block.

4. A video signal processing apparatus of claim 1, wherein the control means write the block out of the shuffling range into a vacant region in the shuffling region of the shuffling memory in a predetermined sequence responsive to said judgement signal.

5. A video signal processing apparatus of claim 3, wherein the received digital video signal is a component signal, and the block is a macro block composed without dividing the minimum video segment of luminance signal and color difference signal at the same position on the pixel.

6. A video signal processing apparatus of claim 5, wherein the macro block includes (1) m DCT blocks of the luminance signals, and (2) n color difference signals, said n color difference signals including two types of color information at the same position on the screen, and the DCT block of the individual signals is the minimum video segment.

7. A video signal processing apparatus of claim 6, wherein the color difference signal is n=1.

8. A method of processing a received digital video signal corresponding to one of a plurality of digital video signals, each one of said plurality of digital video signals corresponding to a respective one of a plurality of television systems of differing effective pixel number, wherein the received digital video signal includes a block and a plurality of pixel data values corresponding to a plurality of pixels, said method comprising the steps of:

determining correlation between said received digital video signal and one of said plurality of digital video signals and generating a judgement signal indicative of said correlation, achieving correspondence between an image region of the received digital video signal and a region of shuffling memory with a specified offset value, said region having a screen region and said image region having a plurality of subblock units, writing said plurality of pixel data values at a position corresponding to the screen region in the shuffling memory region, and writing said plurality of pixel data values in a vacant region of the shuffling range of the shuffling memory as a subblock unit of the image region in an integer multiple of the subblock units.

9. A video signal processing method of claim 8, wherein the writing sequence is predetermined in the step of writing the pixel corresponding to the image out of the shuffling memory region in a vacant region in the shuffling range of the shuffling memory in a basic unit of the region of an integer multiple of blocks.

10. A video signal processing method of claim 8, wherein the input signal is a component signal, and the block is a macro block composed without dividing the minimum video segment of luminance signal and color difference signal at the same position on the pixel.

11. A video signal processing method of claim 10, wherein the macro block includes (1) m luminance signals, and (2) n color difference signals, said n color difference signals including two types of color information at the same position on the screen, the DCT block in the individual signals is the minimum video segment.

12. A video signal processing method of claim 11, wherein the color difference signal is n=1.

* * * * *

UNITED STATES PATENT AND TRADE MARK OFFICE
CERTIFICATE OF CORRECTION

PATENT NO.   : 5,646,695
DATED        : July 8, 1997
INVENTOR(S)  : Fujiwara et al.

It is certified that error appears in the above-identified patent and that said Letters Patent is hereby corrected as shown below:

Column 8, line 24, after "range" delete the comma ",".

Column 8, line 54, after "determining" insert --the--.

Column 8, lines 54-55, delete "correlation between said received digital video signal and".

Column 8, line 56, after "signals" insert --that corresponds to said received digital video signal--.

Column 8, line 57, delete "correlation" and insert --determination--.

Signed and Sealed this

Seventh Day of April, 1998

*Attest:*

BRUCE LEHMAN

*Attesting Officer*    Commissioner of Patents and Trademarks